United States Patent [19]
Holm

[11] 3,817,000
[45] June 18, 1974

[54] APPARATUS FOR PRODUCING THE RING MEMBER OF A GEROTOR GEAR SET

[75] Inventor: Svend Age Holm, Nordberg, Denmark

[73] Assignee: Danfoss A/S, Nordberg, Denmark

[22] Filed: June 19, 1972

[21] Appl. No.: 264,032

Related U.S. Application Data

[62] Division of Ser. No. 115,579, Feb. 16, 1971, Pat. No. 3,705,619.

[52] U.S. Cl. ............................................. 51/204
[51] Int. Cl. ............................................. B24d 17/00
[58] Field of Search ............ 51/204, 331, 338–340, 51/342–355, 52, 287

[56] References Cited
UNITED STATES PATENTS

| | | | |
|---|---|---|---|
| 1,486,340 | 3/1924 | Hoke | 51/52 R |
| 2,151,483 | 3/1939 | Nichols | 51/59 R X |
| 2,181,010 | 11/1939 | Brower | 51/348 |
| 2,986,856 | 6/1961 | Fehr | 51/287 |
| 2,988,859 | 6/1961 | Chaffey | 51/349 |
| 3,561,910 | 11/1967 | Soper | 51/287 |

*Primary Examiner*—Donald G. Kelly

[57] ABSTRACT

The invention relates to a method and apparatus for producing the ring member of a gerotor gear set. Ring members are first formed roughly to size by broaching a stack of blanks. The honing of the crests and flanks of the teeth is done with a honing mandrel having tapered cross section with the same shape as the star member of a gerotor gear set. The honing mandrel is reciprocated and at the same time is given rotational and orbital movements which correspond to the movements of the same character which occur in the operation of a gerotor gear set wherein the star member may have both rotational and orbital movement relative to the ring member of the gear set.

2 Claims, 4 Drawing Figures

PATENTED JUN 18 1974  3,817,000
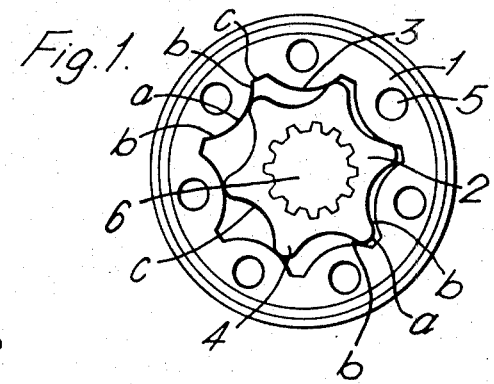
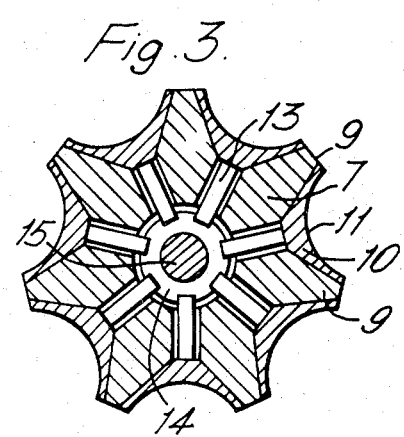
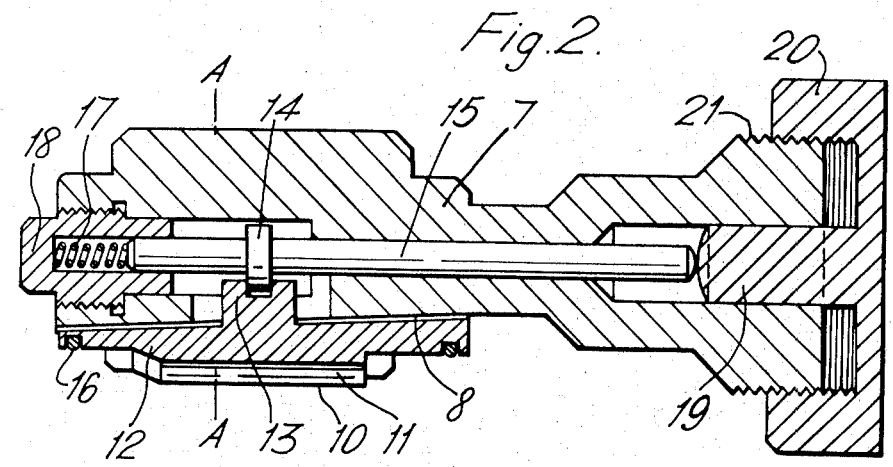
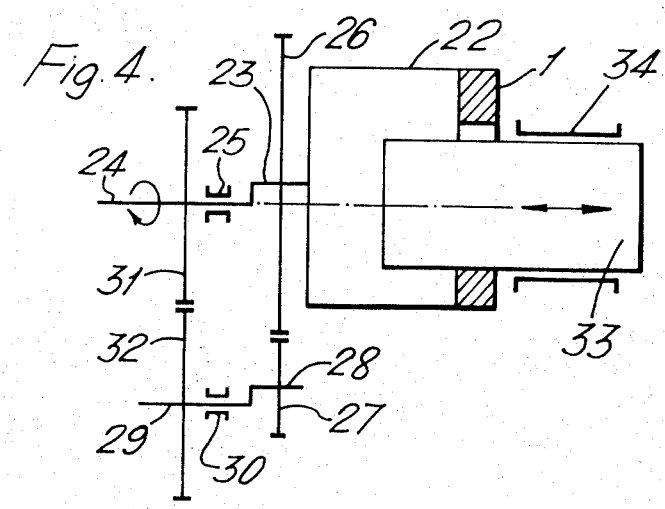

APPARATUS FOR PRODUCING THE RING MEMBER OF A GEROTOR GEAR SET

This is a Division of appln. Ser. No. 115,579, filed Feb. 16, 1971, is now U.S. Pat. No. 3,705,619.

The invention relates to a method of producing a toothed ring for an internal-shaft meshing rotary piston engine, in which the toothed ring cooperates with a toothed wheel, having one tooth fewer, in such manner that one of the toothed elements executes a rotary movement in relation to the other, and the center point of one of the toothed elements executes an orbital movement at higher speed in relation to the center point of the other.

Between the teeth of the ring and of the wheel there are formed displacement chambers which alternately increase and diminish in size. The rate of the orbital movement is a multiple of the rate of the relative rotary movement, this multiple corresponding to the number of teeth on the ring. Such engines can be used in hydraulic equipment as pumps, motors or measuring apparatus.

To enable the toothed elements to form chambers that are sealed off from each other, the profiles of the toothed elements must be formed with great precision. In practice, certain difficulties are encountered in this connection, particularly when it is also required that production costs should not be too great.

The object of the invention is to provide an economical method of producing a toothed ring of the initially described kind, whereby very accurately profiled rings can be made.

According to the invention, this object is achieved by roughly preforming the toothed ring and then causing a honing mandrel of the same shape as the toothed wheel to reciprocate in the toothed ring in the axial direction and at the same time to execute a movement corresponding to the relative rotary and orbital movement.

The rough preshaping of the toothed ring can be accomplished cheaply by, for example, broaching a stack of blanks. The precision machining is then carried out with the help of the honing mandrel which, by executing the rotary movement and the centre-point orbital movement of the toothed ring, precisely generates the required shape of the toothed ring. When this honing operation is carried out on individual toothed rings, workpieces that are very accurate in shape are obtained.

It is particularly advantageous if so much of the root of the tooth is removed during preshaping that only the crests and flanks of the teeth, and not the roots of the teeth of the ring, have to be honed.

In the case of the rotary-piston engines here considered, it is not necessary to treat the root of the tooth as being critical as regards effecting a seal between adjacent chambers. This not only facilitates the honing operation, but also results in a much simplified honing tool. Thus, if the honing tool, only the root and flanks of each tooth, but not its crest, require to be faced with a stone.

For this reason, a honing tool for performing the method of the invention is characterized by a carrier of roughly star-shaped cross-section, which widens linearly in the axial direction, and by concave stones, each fitted between two conical bearings, which stones can be axially moved on the carrier by means of a centrally disposed drive element and can thus be radially displaced. Since the crests of the teeth of the tool are not required for the honing operation, no trouble results from the fact that the periphery of the toothed wheel constituted by the honing tool is comprised of individual stones and that these stones are movable relatively to each other.

Each stone is preferably secured in a slide-block which projects radially inwards and in which engages a drive element on an axially displaceable central bar. By gradually displacing the central bar during the honing operation, the stones are pressed radially outwards, so that the required correct size is achieved.

In a further aspect of the invention, use is advantageously made of a drive providing a rotary and orbital movement and wherein an eccentric with a holder is mounted on a drive shaft and carries a first drive wheel which meshes with a second drive wheel having fewer teeth which is mounted with the same degree of eccentricity on an auxiliary shaft, the drive and auxiliary shafts being linked through a pair of similar drive wheels. By means of this arrangement, the rotary and orbital movement can be imparted to the toothed ring for example, so that a non-rotating, axially reciprocating honing tool can be used. The honing tool can however also be held in the holder for the eccentric, and the toothed ring can be axially reciprocated or, when the ring is firmly clamped, all the movements can be combined in the honing tool.

The invention will now be described in more detail by reference to an embodiment illustrated in the drawing, in which:

FIG. 1 is a schematic illustration of a toothed ring, to be produced by the method of the invention, with a toothed wheel fitted therein, FIG. 2 is a longitudinal section through a honing tool in accordance with the invention, FIG. 3 is a cross-section through the honing tool on the line A—A of FIG. 2, and FIG. 4 is a schematic illustration of a complete tool together with its drive.

FIG. 1 shows a toothed ring 1 in which there rotates a toothed wheel 2. The toothed ring has seven teeth 3, and the toothed wheel has six teeth 4. Each tooth has a crest $a$ and flanks $b$. Between two teeth there is the root $c$. The toothed ring also contains holes 5 for receiving screws. The wheel has internal teeth 6 with which may engage for example the toothed spherical head of a universal-joint shaft.

The honing tool shown in FIGS. 2 and 3 comprises a carrier 7, which is of roughly star-shaped cross-section, the peripheral surface 8 of this cross-section being linearly expanded from right to left. Between each two conical bearings 9 there is fitted a honing stone 10 having a concave face 11. Each stone 10 is secured to a slide block 12 which through an integral arm 13 extends inwardly and engages a drive element 14 on an axially movable central bar 15. All the slide blocks are biased inwardly in the radial direction by annular springs 16. It will be seen that the stones 10 as a whole have a form corresponding to that of the toothed ring 1, excluding the crests $a$ of the teeth.

A spring 17 acts upon the bar 15, this spring bearing against a stop 18 which is screwed into the carrier 7. The bar 15 is thereby pressed against a backing element 19 which has a screw-threaded grip 20 which can be screwed on to the screw-thread 21 on the carrier 7.

The bar 15 can be axially moved in this manner, so that the stones 10 of the honing tool are radially displaced as the result of movement over the surface 8. In FIG. 4, a toothed wheel 2 is secured in a holder 22 which is mounted on an eccentric 23. The eccentric forms part of a drive shaft 24, which is mounted in a bearing 25. The eccentric carries a large drive wheel 26 which cooperates with a small drive wheel 27. The latter is mounted on an eccentric 28 having the same degree of eccentricity as the eccentric 23. The eccentric 28 forms part of an auxiliary shaft 29 which is mounted in bearings 30. The drive shaft 24 and the auxiliary shaft 29 are linked together by means of a pair of similar drive wheels 31 and 32 in such manner that they rotate at the same speed. The drive wheel 26 will have seven times as many teeth as the drive wheel 27. A honing tool, generally designated by the reference numeral 33, is axially displaceable in a fixed bearing 34.

When the honing tool is operating, the drive shaft 24 is rotated at constant speed. The toothed wheel 2 then executes a slow rotary movement, whilst its centre-point executes an orbital movement which is seven times faster. At the same time, the honing tool 33 is axially reciprocated. In this manner, the toothed form of the ring is very accurately generated as far as is necessary for sealing purposes, i.e. without the root $c$. By radial displacement of the stones 10 of the honing tool, the precise dimensions of the toothed ring can be obtained and any wear can be offset.

As seen in FIG. 4, the toothed ring 1 can also be held in the bearing 24 so as not to rotate and can be axially reciprocated, whereas the honing tool 33 is secured in the holder 22 and executes the rotary and orbital movement.

I claim:

1. A honing tool comprising a tapering body portion having protecting elements extending radially relative to the axis of said tapering body, said projecting elements forming a star shaped section, and an abrasive element nested between each pair of adjacent ones of said elements, each of said abrasive elements having a concave surface.

2. A honing tool according to claim 1 including bar means for moving said abrasive elements in an axial direction parallel to the axis of said tapering body.

* * * * *